ial Chemical Industries
United States Patent [19]
Dorrn et al.

[11] 4,025,465
[45] May 24, 1977

[54] FOAMABLE VINYL CHLORIDE POLYMER COMPOSITIONS

[75] Inventors: Clive Dorrn, Langford; Rex William Gould, Welwyn Garden City, both of England

[73] Assignee: Imperial Chemical Industries Limited, London, England

[22] Filed: Dec. 4, 1972

[21] Appl. No.: 311,521

[30] Foreign Application Priority Data

Dec. 9, 1971 United Kingdom ............ 57260/71

[52] U.S. Cl. .................... 260/2.5 R; 260/2.5 D; 260/2.5 HA; 260/2.5 E; 260/28.5 R; 260/33.6 UA; 260/884; 260/899

[51] Int. Cl.² ..................... C08J 9/02; C08J 9/06

[58] Field of Search ............ 260/2.5 P, 2.5 E, 899, 260/2.5 HA, 2.5 R, 884

[56] References Cited

UNITED STATES PATENTS

| | | | |
|---|---|---|---|
| 3,406,230 | 10/1968 | Baxter et al. ................ | 260/2.5 E |
| 3,417,038 | 12/1968 | Soltys ........................... | 260/2.5 P |
| 3,440,309 | 4/1969 | Breukiuk et al. ............. | 260/2.5 E |
| 3,454,507 | 7/1969 | Wluka et al. ................. | 260/2.5 P |
| 3,717,595 | 2/1973 | Huntzinger et al. ........... | 260/2.5 P |

*Primary Examiner*—Morton Foelak
*Attorney, Agent, or Firm*—Cushman, Darby & Cushman

[57] ABSTRACT

Foamable vinyl chloride polymer composition containing as a foam stabilizer an alkyl acrylate polymer.

6 Claims, No Drawings

FOAMABLE VINYL CHLORIDE POLYMER COMPOSITIONS

The present invention relates to foamable rigid vinyl chloride polymer compositions and to the foamed articles produced therefrom.

An increasingly important outlet for vinyl chloride polymers is their use in the production of foamed articles from foamable rigid compositions, particularly articles used in the construction of buildings, such as pipes, panelling, cladding, architraves and skirtings, where the vinyl chloride polymers are used as substitutes for conventional materials such as wood or metal. The compositions may also be used for the manufacture of foamed foils, films and paper substitutes for packaging applications. By a rigid composition we mean a composition having a B.S. softness of from 0–10 in the unexpanded state, as measured by British Standard No. 2782, Method No. 307A. Such a composition is usually unplasticised although it may contain minor proportions of plasticiser provided the rigidity of the composition is not destroyed. In such foamable rigid compositions it is usually necessary to incorporate an additive which stabilises the bubbles of the polymer foam as they are being formed, otherwise the bubbles tend to form in an uncontrolled manner resulting in a very wide distribution in bubble size. Sucn uncontrolled growth often results in the bubbles bursting and coalescing and this results in an unacceptably uneven foamed structure. The additives incorporated to prevent such uncontrolled growth are hereinafter termed "foam stabilisers". Known foam stabilisers are the well known arcylic processing aids based on methyl methacrylate copolymers containing at least 85% of polymerised methyl methacrylate. A particularly well known example of this type of processing aid is a methyl methacrylate/ethyl acrylate copolymer containing 90 parts by weight of methyl methacrylate and 10 parts by weight of ethyl acrylate.

We have found, however, that although such processing aids are very effective as foam stabilisers, it is necessary to use relatively large quantities of them in order to achieve acceptable foam stabilisation. Thus, in the case of the above mentioned methyl methacrylate copolymer, we have found it necessary to use in excess of 5% by weight based on the weight of vinyl chloride polymer and preferably in excess of 8% by weight. The use of such large amounts of foam stabiliser, which is often an expensive material, is clearly undesirable from an economic point of view and it would therefore be advantageous to achieve effective stabilisation using much smaller amounts of foam stabiliser. We have now found that effective stabilisation may surprisingly be obtained by the use of small amounts of certain alkyl acrylate polymers as foam stabiliser.

According to the present invention, we provide a foamable rigid vinyl chloride polymer composition containing as foam stabiliser at least one alkyl acrylate polymer in an amount 0.2–5% by weight of the vinyl chloride polymer in said composition.

By the term alkyl acrylate polymer we mean either an alkyl acrylate homopolymer or a copolymer of an alkyl acrylate with up to 40% by weight thereof of one or more comonomers. When an alkyl acrylate copolymer is used as foam stabiliser however, it preferably contains less than 25% by weight of comonomer units, particularly preferably less than 10% by weight. Suitable comonomers include styrene, alkyl methacrylates such as methyl methacrylate, acrylonitrile, acrylamides, and other alkyl acrylates. Examples of alkyl acrylate homopolymers which may be used include polymers prepared from methyl acrylate, ethyl acrylate, n- or iso-propyl acrylate, n- or iso-butyl acrylate and 2-ethyl hexyl acrylate.

We prefer to use n-butyl acrylate homopolymer or copolymer as the foam stabiliser in our foamable compositions.

If n-butyl acrylate homo- or co-polymers are used in our invention they preferably have a molecular weight corresponding to a reduced viscosity (measured as a 0.1% by weight solution in chloroform at 25° C) within the range 0.1 to 7 dl/g and particularly preferably have a molecular weight corresponding to a reduced viscosity within the range 0.2-5.0 dl/g.

By the term vinyl chloride polymer we mean either a vinyl chloride homopolymer or a copolymer of vinyl chloride with a minor amount (preferably up to 20% by weight thereof) one or more ethylenically unsaturated comonomers. Suitable comonomers include vinyl acetate, vinyl ethers, vinylidene chloride, alkyl acrylates, and olefines such as ethylene or propylene. The vinyl chloride polymers used in our invention preferably have a Fikentsher K value between 45 and 75 and particularly preferably have a K value between 50 and 65. They may be prepared using any of the well known polymerisation techniques, e.g. suspension, emulsion, bulk, solution and gas phase polymerisation.

The foamable composition should if necessary contain a blowing agent or a combination of blowing agents. Suitable blowing agents are materials (usually solids) which decompose on heating to yield a gas which effects foaming liquids which vaporise on heating or on the reduction of pressure to effect foaming (e.g. pentane, hexane etc.) or gases. The temperature at which the decomposible types of blowing agents decompose to release gas and the liquid blowing agents vaporise to effect foaming is generally known as the activation temperature. We generally prefer to use the decomposable type of blowing agent in the compositions of our invention. The decomposable type of blowing agent is usually used in an amount of 0.1 to 2% by weight based on the vinyl chloride polymer in the foamable composition, preferably 0.25 to 1%. Examples of suitable decomposable blowing agents include the nitrogen liberating blowing agents, for example the azo, hydrazo and nitroso organic compounds (such as azodicarbonamide, dinitrosopentamethylene tetramine, p,p'-oxy-bis-sulphonyl hydrazide), and also the carbon dioxide liberating blowing agents, for example carbonates and bicarbonates. In some instances it may be desirable to include a nucleating agent in the foamable material to provide sites for bubble formation. In certain cases, it may not be necessary to include a blowing agent in the foamable composition, since some compositions are self-foaming. Thus, for example vinyl chloride/methyl methacrylate copolymers are self-foaming in that they eliminate methyl chloride on heating.

The foamable compositions of our invention may also contain other commonly used additives in order to achieve any desirable or necessary property or combination of properties. Such additional additives may include stabilisers, lubricants, dyes, pigments, impact modifiers, processing aids (in minor amounts which will not render the composition uneconomic) and fillers.

We prefer in our foamable compositions to use from 0.25–2.5% by weight of alkyl acrylate polymer based on the weight of vinyl chloride polymer in the composition and in particular from 0.5–1% by weight.

The alkyl acrylate polymers used in our compositions may be prepared by any suitable conventional polymerisation technique that is well known in the art e.g. emulsion or solution polymerisation. As an example we provide a recipe for the preparation by emulsion polymerisation of a poly-n-butyl acrylate homopolymer.

11.8 liters of demineralised water, 30 g of "Nansa" 1106 (a biodegradable commercially available emulsifier), 7.4 g of potassium persulphate, 6.5 liters of n-butyl acrylate and 30 ml of lauryl mercaptan are charged under a nitrogen blanket to an autoclave (capacity 5 gallons) and subjected to mild agitation. The temperature is raised to 60° C and after holding the reaction mixture at this temperature for 10 minutes, the heat of reaction causes the temperature to rise to above 80° C. The batch is held at 80° C for one hour before cooling and discharging. The product is a latex of about 32% solids content and the polymer has a reduced viscosity of 0.66 dl/g (measured as a 0.1% by weight solution in chloroform at 25° C). Alternative initiators which may be used include ammonium persulphate and redox systems; alternative emulsifiers include sodium lauryl sulphate, sodium dodecyl benzene sulphonate, alternative chain transfer agents include $C_3$–$C_{16}$ straight chain mercaptans, secondary mercaptans and tertiary mercaptans. It is not necessary to employ a chain transfer agent in which case a product of higher reduced viscosity will be obtained.

It is to be understood that the above recipe is only an example and is no way meant to limit the scope of our invention.

The molecular weight of the alkyl acrylate polymers used in our compositions may be controlled during their preparation by the temperature of the polymerisation reaction, by the use of chain transfer agents such as alkyl mercaptan, by the use of minor amounts of cross-linking agents such as diallyl phthalate and glycol dimethacrylate to increase molecular weight or any suitable combination thereof. Cross-linked alkyl acrylate polymers may also be used. They may be prepared in any suitable manner, e.g. by employing relatively large amounts of cross-linking agents such as diallyl phthalate.

The alkyl acrylate polymer may be incorporated into the vinyl chloride polymer by any suitable method. One such method comprises coagulating a latex of alkyl acrylate polymer onto a vinyl chloride polymer slurry. Suitable coagulants that may be used to effect coagulation include electrolytes such as water soluble, preferably polyvalent, metal salts and in particular salts of calcium or aluminium. The coagulant is preferably one whose residues, should they be retained in the polymer blend, will not adversely effect the properties of the blend. Calcium formate is a particularly preferred coagulant.

Another method for effecting incorporation comprises producing the alkyl acrylate polymer by polymerisation of the monomer(s) in the presence of a vinyl chloride latex or slurry.

Another method, and one which we prefer to use, comprises polymerising vinyl chloride (and optionally one or more comonomers) in the presence of a latex of the alkyl acrylate polymer to be incorporated added before or during polymerisation. In this method some grafting of vinyl chloride onto the alkyl acrylate polymer may occur and the scope of our invention is intended to embrace such graft polymers or mixtures of graft polymers and homopolymers.

The vinyl chloride polymer having the alkyl acrylate polymer incorporated therein may be used as such in the foamable compositions of our invention or may be used as a masterbatch, in which case they are diluted with more vinyl chloride polymer. Thus, it may, for example, be convenient to prepare a vinyl chloride polymer/alkyl acrylate polymer blend having a polymerised alkyl acrylate content well in excess of 5% by weight and to dilute this as necessary with more vinyl chloride polymer (which need not be the same as that in the blend) when preparing the compositions of our invention.

The foamable rigid vinyl chloride polymer compositions of our invention may be foamed during processing in any suitable manner. For example, the blowing agent (if used) may be mixed into the composition during hot compounding at a temperature below the activation temperature of the blowing agent or may be mixed into the cold powdery composition at ambient temperatures or may be introduced during the incorporation of the alkyl acrylate polymer, and in each case the resulting composition may be processed (e.g. by extrusion, by injection, compression or blow moulding, by calendering, by vacuum forming or by pressing etc.) under conditions of temperature and pressure sufficient to activate the blowing agent as well as melt the polymer so that foamed articles are obtained.

The compositions of the present invention may allow the production of excellent vinyl chloride polymer foams having suitably low density (e.g. within the range 0.6–0.9 g/ml and particularly within the range 0.7–0.8 g/ml) and having a narrow distribution of bubble size with the majority of the bubbles of closed structure.

The foamable compositions of the present invention may be used for the production of a great variety of rigid foamed articles, examples of which include pipes, panels, claddings and doors, and other wood substitute products in general e.g. building joinery and furniture. Other products which may be produced from our foamable compositions include foils, films and paper substitutes for packaging applications.

The present invention is illustrated by the following Examples.

EXAMPLES 1 to 4

Each of the compositions shown in Table 1 was compounded by mastication in a Banbury mixer (at 145° C) and then processed on a two-roll mill (roll temperatures 130° and 140° C) to form a crepe. Each crepe was diced to give approximately 3 mm diameter granules. At this stage there was no decomposition of the blowing agents used in each composition and the materials were unfoamed and essentially rigid (B.S. softness about 2). Their densities ranged from 1.41 to 1.42 g/ml.

The PVC/PBA graft polymer used in Examples 3 and 4 was produced by polymerising 98.5 parts by weight of vinyl chloride in the presence of 1.5 parts by weight of an n-butyl acrylate homopolymer (used in the form of a latex and prepared according to the exemplified recipe described hereinbefore), the temperature of polymerisation being such that the resulting polymer had a K-value of 60.

TABLE 1

| Ingredients of Composition (parts by weight) | Example No. 1 | 2 | 3 | 4 |
|---|---|---|---|---|
| 'Corvic' D60/11 (a) | 100 | 100 | 50 | 30 |
| PVC/PBA graft, 98.5/1.5, of K-value 60 | — | — | 50 | 70 |
| Tribasic lead stearate | 4 | 4 | 4 | 4 |
| Normal lead stearate | 0.5 | 0.5 | 0.5 | 0.5 |
| Hard wax lubricant | 1 | 1 | 1 | 1 |
| Chlorinated paraffin plasticiser | 20 | 20 | 20 | 20 |
| CaCO₃ filler | 10 | 10 | 10 | 10 |
| Methyl methacrylate/ethylarcylate 90/10 copolymer | — | 6 | — | — |
| Oxy-bis(benzene sulphonhydrazide) (blowing agent) | 0.6 | 0.6 | 0.6 | 0.6 |
| Azodicarbonamide (blowing agent) | 0.3 | 0.3 | 0.3 | 0.3 |

(a) 'Corvic' D60/11 is a vinyl chloride homopolymer of K-value about 60 (the word 'Corvic' is a registered Trade Mark)

The granules made from each composition were extruded into rod on a 1.25 inch single screw extruder (length/diameter ratio 20) using a die (at a temperature of 150° C) with a diameter of 0.5 inches. The barrel of the extruder had a temperature profile of 160° – 180° C.

The extrusion produced in Example 1 had a density of 1.2 g/ml and its surface was rough and broken and the cell structure was very uneven. The extrusions made in Examples 2 to 4 all produced extrusions of lower density (see Table 2) with a smooth skin and a small, even, closed-cell structure. The properties of the foamed extrusions are listed below in Table 2.

TABLE 2

| Property measured | Rod from Example 2 | 3 | 4 |
|---|---|---|---|
| Density (g/ml) | 0.75 | 0.80 | 0.70 |
| Flexural Modulus (a) (MN/m²) | 1050 | 1100 | 900 |
| Flexural Strength (b) (MN/m²) | 18 | 20 | 14 |

(a) BS 2782 : 1970 Method 302D
(b) BS 2782 : 1970 Method 304E

EXAMPLES 5 to 7

Each of the compositions shown in Table 3 was compounded by mastication in a Banbury mixer (at 155° C), and then processed on a two-roll mill to form a crepe and diced as in Examples 1 to 4. The unfoamed granules had a density within the range 1.43 to 1.44 g/l.

The PVC/PBA graft polymer used in Example 7 was prepared in the same way as that used in Examples 3 and 4, except that the polymerisation temperature was adjusted to provide a polymer of K-value 53.

TABLE 3

| Ingredients of Composition (parts by weight) | Example No. 5 | 6 | 7 |
|---|---|---|---|
| 'Corvic' D55/9 (a) | 100 | 100 | 50 |
| PVC/PBA graft, 98.5/1.5, K-value 53 | — | — | 50 |
| Tribasic lead stearate | 4 | 4 | 4 |
| Normal lead stearate | 0.5 | 0.5 | 0.5 |
| Hard wax lubricant | 1 | 1 | 1 |
| Expoxidized soya bean oil | 3 | 3 | 3 |
| Methyl methacrylate/ethyl acrylate, 90/10 copolymer | — | 10 | — |
| Acrylonitrile/butadiene/styrene copolymer (impact modifier) | 8 | 8 | 8 |
| CaCO₃ (filler) | 10 | 10 | 10 |
| Oxy-bis(benzene sulphonhydrazide) | 0.5 | 0.5 | 0.5 |
| Azodicarbonamide | 0.4 | 0.4 | 0.4 |

(a) 'Corvic' D55/9 is a vinyl chloride homopolymer of K-value about 55.

The granules made from each composition were extruded into 2 × ⅝ inch rectangular plank using a 2.5 inch single screw extruder (length/diameter ratio 25).

The extruded plank produced in Example 4 had a high foam density (1.1 g/ml) and had a rough surface and an uneven cellular structure (with many large voids in the centre of the extrusion). The extruded products made in Examples 6 and 7 were of excellent quality, having low density, a closed and even cell structure and an integral skin. Some properties of the foamed extrusions are listed in Table 4.

TABLE 4

| Property measured | Plank from Example 6 | 7 |
|---|---|---|
| Density g/l | 0.71 | 0.68 |
| Flexural strength MN/m² | 24 | 22 |
| Flexural modulus (MN/m²) | 1200 | 1200 |
| Thermal conductivity | 0.07 | 0.07 |

The above Examples show that it is possible to obtain rigid foamed products of excellent quality by using a very small amount of foam stabiliser according to our invention. Such products are of comparable quality to foams made using a much larger amount of a 90/10 methyl methacrylate/ethyl acrylate copolymer as foam stabiliser.

We claim:

1. A foamable rigid vinyl chloride polymer composition having a B.S. softness of 0–10 in the unexpanded state containing as foam stabilizer at least one alkyl acrylate polymer made by polymerizing monomers consisting essentially of an alkyl acrylate and 0–25% by weight thereof of at least one comonomer selected from the group consisting of styrene, alkyl methacrylates, acrylamides and other alkyl acrylates in an amount of 0.2 to 2.5% by weight of the vinyl chloride polymer in said composition.

2. A composition according to claim 1 in which the foam stabiliser is an n-butyl acrylate homo- or copolymer.

3. A composition according to claim 2 in which the foam stabiliser is a copolymer of n-butyl acrylate and methyl methacrylate.

4. A composition according to claim 2 in which the n-butyl acrylate homo- or co-polymer has a reduced viscosity (measured as a 0.1% by weight solution in chloroform at 25° C) within the range 0.2 to 5 dl/g.

5. A composition according to claim 1 which contains a blowing agent of the decomposable type which decomposes on heating to yield a gas which effects foaming.

6. A method of producing a foamable rigid vinyl chloride polymer composition which includes incorporating into a vinyl chloride polymer a foam stabilizer, which comprises at least one alkyl acrylate polymer made by polymerizing monomers consisting essentially of at least one alkyl acrylate with 0–25% by weight thereof of at least one comonomer selected from the group consisting of styrene, alkyl methacrylates, acrylamides and other alkyl acrylates, in an amount of 0.2 to 2.5% by weight of the vinyl chloride polymer, the foamable composition being formed in two stages, a composition containing more than 2.5% by weight of the foam stabilizer, based on the weight of the vinyl chloride polymer present, being formed in the first stage and a composition containing 0.2 to 2.5% by weight of the foam stabilizer, based on the weight of the vinyl chloride polymer present being formed in the second stage by dilution with further vinyl chloride polymer.

* * * * *